D. D. KING.
LAMP.
APPLICATION FILED MAR. 13, 1914.
1,104,264.
Patented July 21, 1914.
2 SHEETS—SHEET 2.
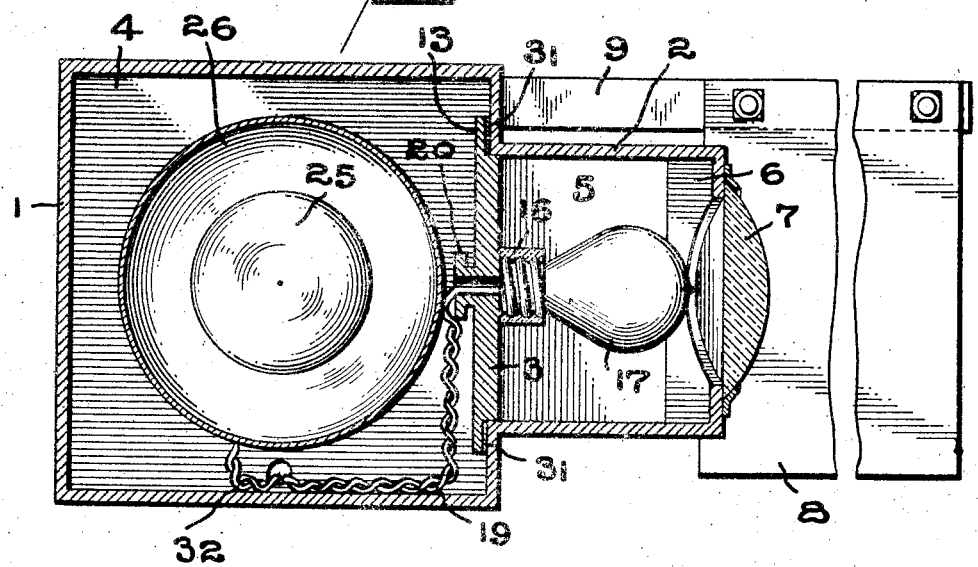
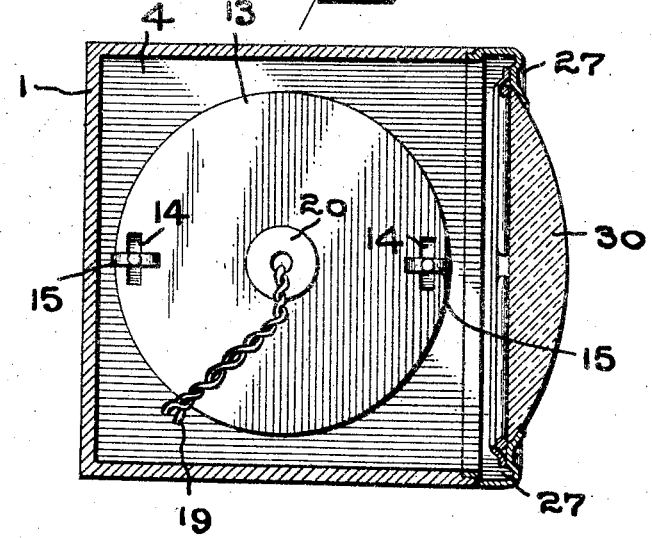
Witnesses
L. P. Moyer
C. R. Ziegler.
Inventor
Dwight D. King.
By Joshua R. H. Potts.
Attorney

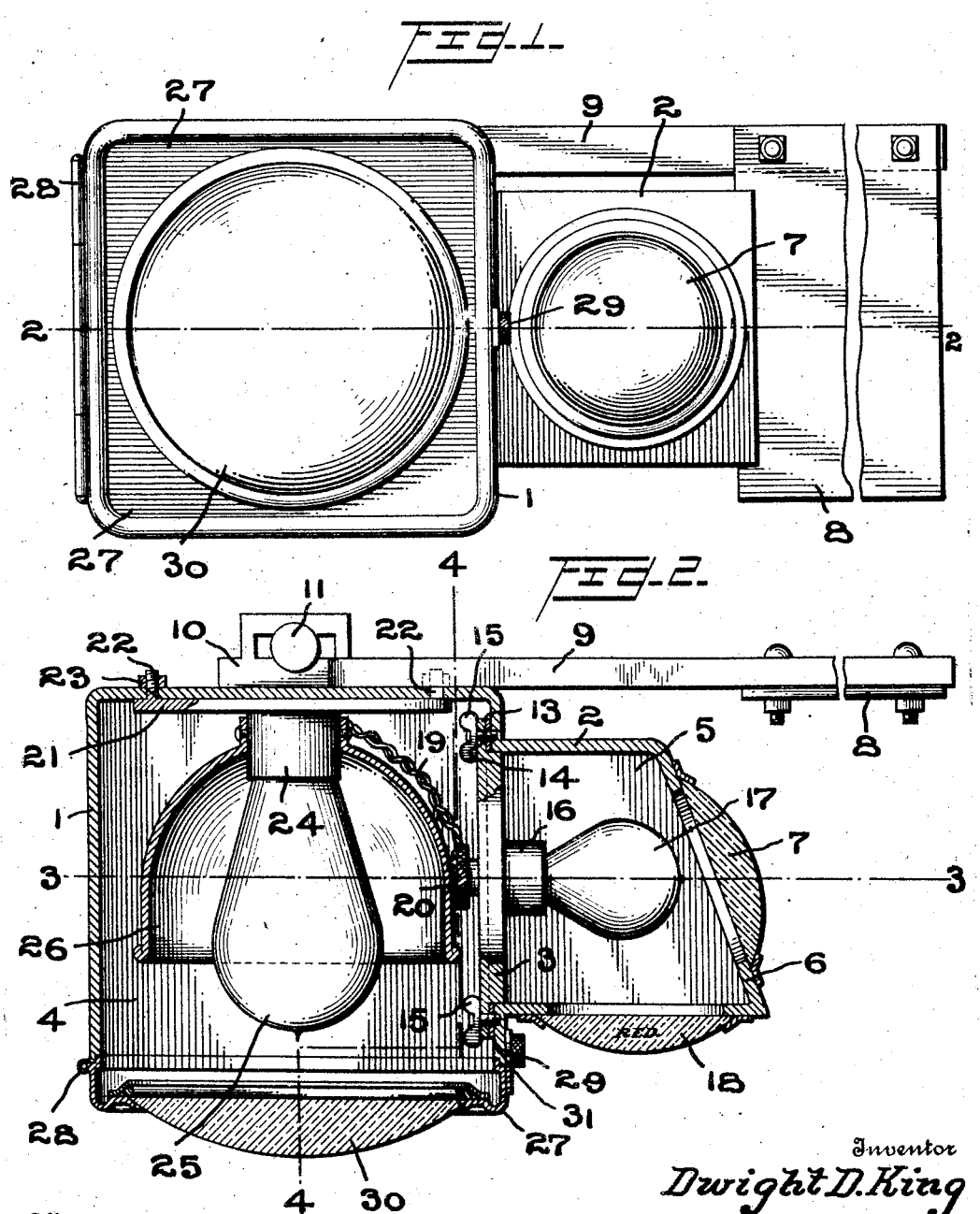

UNITED STATES PATENT OFFICE.

DWIGHT D. KING, OF WARREN, PENNSYLVANIA.

LAMP.

1,104,264.    Specification of Letters Patent.    Patented July 21, 1914.

Application filed March 13, 1914. Serial No. 824,431.

*To all whom it may concern:*

Be it known that I, DWIGHT D. KING, a citizen of the United States, residing at Warren, in the county of Warren and State of Pennsylvania, have invented certain new and useful Improvements in Lamps, of which the following is a specification.

My invention relates to improvements in lamps, and more particularly to an improved lamp designed for use as a tail light on automobiles and other vehicles, the object of the invention being to provide a lamp divided into two entirely independent compartments and in one compartment provide a light to perform the double function of illuminating the license tag and showing a red signal and in the other compartment provide a light designed to illuminate the roadway at the rear of the car whenever desired.

It frequently happens that it is desirable to illuminate the road or street at the rear of the car. This is particularly true where it is customary to back the car into the garage or to back the car anywhere along the road in turning or in otherwise manipulating the car. This is a source of considerable trouble to drivers, and it is the purpose of my invention to provide a lamp which performs all the functions of the ordinary tail lamp and in addition provides a lamp which operates as a search light to illuminate the road at the rear of the car whenever desired.

With these and other objects in view, the invention consists in certain novel features of construction and combinations and arrangements of parts as will be more fully hereinafter described and pointed out in the claims.

In the accompanying drawings: Figure 1 is a view in elevation illustrating my improvements. Fig. 2 is a view in horizontal section on the line 2—2 of Fig. 1. Fig. 3 is a view in vertical section on the line 3—3 of Fig. 2, and Fig. 4 is a view in transverse section on the line 4—4 of Fig. 2.

1 represents the casing of my improved lamp which at one side is provided with an extension 2, and at the inner end of the extension 2, I provide a removable partition block 3 which divides the casing into a relatively large chamber 4 and a relatively small chamber 5, the latter chamber formed in the extension 2. The end of extension 2 is preferably at an angle as shown at 6, and is provided with a lens 7 through which the light is thrown upon the license tag 8, and while my invention is not limited to any particular support for the license tag, I have shown the same secured to a bracket arm 9 forming an integral part of a bracket 10 secured to the rear wall of casing 1 and adapted to receive a fixed support 11 secured to the rear of the vehicle in any approved manner.

The block 3 is of general rectangular shape fitting within the chamber 5, and has a flange 13 bearing against the wall of chamber 4. This flange 13 has slots 14 for the reception of turn buttons 15 to securely lock the block in place. A socket 16 is provided on one side of block 3 for the reception of an electric lamp 17 and this lamp throws the light through the lens 7 onto the license tag and also illuminates a red lens 18 in the side of extension 2. The electric wires 19, supplying current to lamp 17, are connected in circuit with the ordinary lighting system of the vehicle so that the lamp at night remains illuminated at all times. A knob 20 is provided on the block 3 to facilitate its manipulation, and this block may be removed to allow access to the interior of chamber 5 whenever desired.

To the rear wall of the relatively large chamber 4, I secure a plate 21. The means illustrated for attaching this plate consist of threaded lugs 22 on the plate projected through the rear wall of the casing and secured by nuts 23, although of course I am not limited to this particular securing means. This plate 21 supports a lamp socket 24 in which an electric lamp 25 is located, and a reflector 26 is secured around the socket 24. The wires 32 supplying electric current to the lamp 25 are connected in a circuit independent of the ordinary lighting system of the vehicle, so that the lamp 25 is only illuminated at such times as it is desired to throw light on the road at the rear of the vehicle, but ordinarily this lamp is out. The rear wall of the relatively large chamber 4 of casing 1 is normally closed by a door 27 having a hinge 28 at one edge, and a fastening device 29 at its other edge. In this door 27, a relatively large lens 30 is located so as to throw the light in a relatively wide path.

It will be observed that when the door 27 is opened, the plate 21 with all the parts carried thereby can be removed and thoroughly cleaned. When this plate with its parts are removed, block 3 can be removed, and with it the lamp 17 so that the lamp and the interior of chamber 5 can be cleaned.

There will be, of course, sufficient slack in the electric wires to allow these parts to be removed from the casing, and when they are replaced, the chambers 4 and 5 will be entirely separated from each other, and to make this separation proof against light, I have provided a gasket 31 between the flange 13 and the inner face of the casing.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a casing having an extension at one side, of a removable block secured to the casing at the inner end of the extension, dividing the casing into two chambers, one comprising the main portion of the casing and the other the extension, both of said chambers having lights therein, said extension having a lens at one end for throwing light upon a license tag and having a red lens in one side, and said main portion in the casing having a lens in its end, substantially as described.

2. A lamp of the character described, comprising a casing having an extension at one side, a block removably secured in the casing at the inner end of the extension and dividing the casing into a relatively small chamber in the extension and a relatively large chamber in the main portion of the casing, a lamp socket on the block inside the chamber of the extension, said extension having two transparent portions, one adapted to permit the light to be thrown upon the license tag and the other red in color, a door closing the relatively large chamber and having a transparent portion, and a lamp located in the relatively large chamber, substantially as described.

3. A lamp of the character described, comprising a casing having an extension at one side, a block removably secured in the casing at the inner end of the extension and dividing the casing into a relatively small chamber in the extension and a relatively large chamber in the main portion of the casing, a lamp socket on the block inside the chamber of the extension, said extension having two transparent portions, one adapted to permit the light to be thrown upon the license tag and the other red in color, a door closing the relatively large chamber and having a transparent portion, a plate secured in the relatively large chamber and having a lamp socket therein, and a reflector secured around the socket, substantially as described.

In testimony whereof I have signed my name to this specification in the presence of two subscribing witnesses.

DWIGHT D. KING.

Witnesses:
A. L. KING,
B. G. PARSHALL.